United States Patent
Endo (10) Patent No.: US 11,379,547 B2
(45) Date of Patent: Jul. 5, 2022

(54) INFORMATION PROCESSING SYSTEM, SERVER, NON-TRANSITORY COMPUTER-READABLE STORAGE MEDIUM, AND METHOD FOR PROCESSING INFORMATION

(71) Applicant: TOYOTA JIDOSHA KABUSHIKI KAISHA, Toyota (JP)

(72) Inventor: Jun Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 16/538,910

(22) Filed: Aug. 13, 2019

(65) Prior Publication Data
US 2020/0151230 A1 May 14, 2020

(30) Foreign Application Priority Data
Nov. 8, 2018 (JP) .............................. JP2018-210860

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/5854* (2019.01); *G06N 5/04* (2013.01);
(Continued)

(58) Field of Classification Search
CPC . G06F 16/9535; G06F 16/5854; G06N 20/00; G06N 5/04; G06K 9/00288; G06K 9/00832; H04L 63/0861
See application file for complete search history.

(56) References Cited

U.S. PATENT DOCUMENTS

2017/0255868 A1* 9/2017 Gelinas .................. G06N 20/00
2018/0218433 A1* 8/2018 Penner ................... G06N 20/00
(Continued)

FOREIGN PATENT DOCUMENTS

| JP | 2002-215770 A | 8/2002 |
|---|---|---|
| JP | 2008-120289 A | 5/2008 |

(Continued)

*Primary Examiner* — Nancy Bitar
*Assistant Examiner* — Xiao Liu
(74) *Attorney, Agent, or Firm* — Oblon, McClelland, Maier & Neustadt, L.L.P.

(57) ABSTRACT

An information processing system includes: a vehicle configured to capture an image of clothing and accessories of a user when the user gets in the vehicle to generate a clothing and accessories image; and a server configured to communicate with the vehicle and a terminal device of the user. The server is configured to: train a supervised learning model by using at least one of schedule information of the user and weather information as input data and clothing and accessories information as training data; estimate clothing and accessories according to at least one of schedule information of the user and weather information for the next time the user gets in the vehicle by using the trained supervised learning model; and send clothing and accessories recommendation information indicating the estimated clothing and accessories to the terminal device of the user.

16 Claims, 8 Drawing Sheets

(51) Int. Cl.
   *H04L 9/40*      (2022.01)
   *G06F 16/583*    (2019.01)
   *G06N 5/04*      (2006.01)
   *G06N 20/00*     (2019.01)
   *G06V 20/59*     (2022.01)
   *G06V 40/16*     (2022.01)

(52) U.S. Cl.
   CPC ............. *G06N 20/00* (2019.01); *G06V 20/59* (2022.01); *G06V 40/172* (2022.01); *H04L 63/0861* (2013.01)

(56) References Cited

U.S. PATENT DOCUMENTS

2019/0080172 A1*  3/2019  Zheng ................ H04N 5/23293
2019/0176845 A1*  6/2019  Yoon .................. G06K 9/00288
2019/0263415 A1*  8/2019  Gong ................. G06K 9/00288
2019/0317960 A1* 10/2019  Sugaya .............. G06F 16/5866

FOREIGN PATENT DOCUMENTS

JP    2010-140420 A    6/2010
JP    2014-164454 A    9/2014

\* cited by examiner

| SCHEDULE INFORMATION | | | | WEATHER INFORMATION | | | | CLOTHING AND ACCESSORIES IMAGE | CLOTHING AND ACCESSORIES INFORMATION |
|---|---|---|---|---|---|---|---|---|---|
| PURPOSE | DEPARTURE POINT | DESTINATION | DEPARTURE DATE AND TIME | ARRIVAL DATE AND TIME | WEATHER DESCRIPTION | TEMPERATURE | HUMIDITY | WIND SPEED | | |
| ** | ** | ** | ** | ** | ** | ** | ** | ** | ** | ** |

FIG. 8

INFORMATION PROCESSING SYSTEM, SERVER, NON-TRANSITORY COMPUTER-READABLE STORAGE MEDIUM, AND METHOD FOR PROCESSING INFORMATION

INCORPORATION BY REFERENCE

The disclosure of Japanese Patent Application No. 2018-210860 filed on Nov. 8, 2018 including the specification, drawings and abstract is incorporated herein by reference in its entirety.

BACKGROUND

1. Technical Field

The present disclosure relates to information processing systems, servers, non-transitory computer-readable storage mediums, and methods for processing information.

2. Description of Related Art

Recently, a technology of recommending clothing and accessories to users has been known in the art. For example, Japanese Patent Application Publication No. 2002-215770 (JP 2002-215770 A) describes a system that registers image data of clothing and accessories owned by an individual therein, combines items of the clothing and accessories based on the user's schedule, weather, user's preferences, trends, etc., and provides coordination information indicating the combined items to the user.

SUMMARY

However, in the related art of recommending clothing and accessories to users, the user needs to take pictures of his or her own clothing and accessories with an imaging device and then operate a terminal device to import the image data of the clothing and accessories from the imaging device to the terminal device, and send the image data from the terminal device to a server. The operational burden on the user is therefore heavy at times, and the operation is sometimes time-consuming. It is therefore desired to improve convenience of the technique of recommending clothing and accessories to users.

The present disclosure improves convenience of the technique of recommending clothing and accessories to users.

An information processing system according to a first aspect of the present disclosure includes: a vehicle configured to capture an image of clothing and accessories of a user when the user gets in the vehicle to generate a clothing and accessories image; and a server configured to communicate with the vehicle and a terminal device of the user. The vehicle or the server is configured to recognize the clothing and accessories of the user from the clothing and accessories image. The server is configured to train a supervised learning model by using at least one of schedule information of the user and weather information at the time the user gets in the vehicle as input data, and clothing and accessories information indicating the recognized clothing and accessories as training data. The server is configured to estimate clothing and accessories according to at least one of schedule information of the user and weather information for the next time the user gets in the vehicle by using the trained supervised learning model. The server is configured to send clothing and accessories recommendation information indicating the estimated clothing and accessories to the terminal device of the user.

In the information processing system according to the first aspect of the present disclosure, the clothing and accessories image may include a face of the user, and the vehicle or the server may be configured to recognize the clothing and accessories of the user from the clothing and accessories image if it is determined from the clothing and accessories image and by face authentication that the user is a registered user that is a user that has been preregistered.

In the information processing system according to the first aspect of the present disclosure, the server may be configured to send the clothing and accessories recommendation information to the terminal device if it is determined based on the schedule information of the user that it is a predetermined time before the next time the user gets in the vehicle.

In the information processing system according to the first aspect of the present disclosure, each of the clothing and accessories information and the clothing and accessories recommendation information may include clothing and accessories identification information that allows the user to uniquely identify the clothing and accessories or attribute information of the clothing and accessories.

In the information processing system according to the first aspect of the present disclosure, the schedule information may include at least one of a purpose of using the vehicle, a departure point, a destination, departure date and time, and arrival date and time, and the server may be configured to estimate at least a part of the schedule information at the time the user gets in the vehicle based on date and time information and position information of the vehicle at the time the user traveled in the vehicle in the past.

A server according to a second aspect of the present disclosure includes: a communication device configured to communicate with a vehicle and a terminal device of a user, the vehicle being configured to capture an image of clothing and accessories of the user when the user gets in the vehicle to generate a clothing and accessories image; and a processor. The processor is configured to train a supervised learning model by using at least one of schedule information of the user and weather information at the time the user gets in the vehicle as input data, and clothing and accessories information indicating the recognized clothing and accessories as training data. The processor is configured to estimate clothing and accessories according to at least one of schedule information of the user and weather information for the next time the user gets in the vehicle by using the trained supervised learning model. The processor is configured to send clothing and accessories recommendation information indicating the estimated clothing and accessories to the terminal device of the user via the communication device.

A non-transitory computer-readable storage medium according to a third aspect of the present disclosure has stored in the non-transitory computer-readable storage medium a program that causes an information processing device to execute an information processing process of the information processing device. The information processing device is configured to communicate with a vehicle and a terminal device of a user. The vehicle is configured to capture an image of clothing and accessories of the user when the user gets in the vehicle to generate a clothing and accessories image. The program causes the information processing device to execute the information processing process, and the information processing process includes: training, by the information processing device, a supervised learning model by using at least one of schedule information of the user and weather information at the time the user gets in the vehicle as input data, and clothing and accessories information indicating the recognized clothing and accessories as training data; estimating, by the information processing device, clothing and accessories according to at least one of schedule information of the user and weather information for the next time the user gets in the vehicle by using the trained supervised learning model; and sending clothing and accessories recommendation information indicating the estimated clothing and accessories from the information processing device to the terminal device of the user.

A method for processing information according to a fourth aspect of the present disclosure is performed by an information processing system including a vehicle and a server. The vehicle includes an imaging device that captures an image of a user of the vehicle, and the server is configured to communicate with the vehicle and a terminal device of the user of the vehicle. The method includes: capturing, by the vehicle, an image of clothing and accessories of the user when the user gets in the vehicle to generate a clothing and accessories image; recognizing, by the vehicle or the server, the clothing and accessories of the user from the clothing and accessories image; training, by the server, a supervised learning model by using at least one of schedule information of the user and weather information at the time the user gets in the vehicle as input data, and clothing and accessories information indicating the recognized clothing and accessories as training data; estimating, by the server, clothing and accessories according to at least one of schedule information of the user and weather information for the next time the user gets in the vehicle by using the trained supervised learning model; and sending clothing and accessories recommendation information indicating the estimated clothing and accessories from the server to the terminal device of the user.

The present disclosure thus improves convenience of the technique of recommending clothing and accessories to users.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described below.

Configuration of Information Processing System

Figure 1:
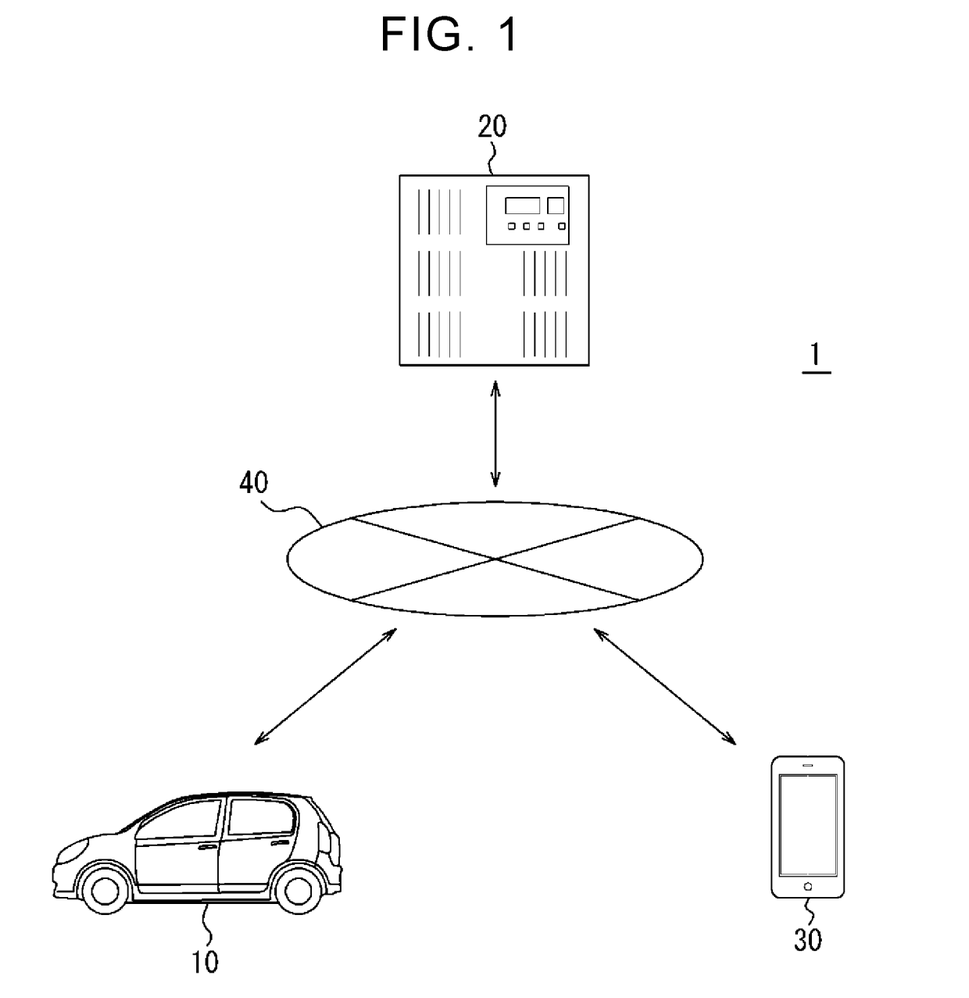
FIG. 1 is a diagram schematically showing the configuration of an information processing system according to an embodiment of the present disclosure.

An information processing system 1 according to an embodiment of the present disclosure will be generally described with reference to FIG. 1. The information processing system 1 includes a vehicle 10, a server 20, and a terminal device 30. The vehicle 10, the server 20, and the terminal device 30 are connected to a network 40 including, e.g., a mobile communication network, the Internet, etc. so that they can communicate with the network 40.

An example of the vehicle 10 includes, but is not limited to, an automobile. The vehicle 10 may be any vehicle that can be used by a user. The server 20 includes one server device or a plurality of server devices that can communicate with each other. Examples of the terminal device 30 include, but are not limited to, a smartphone, a smart speaker, and a personal computer (PC). The terminal device 30 may be any device that is used by a user.

The present embodiment will first be generally described and will be described in detail later. When the user gets in the vehicle 10, the vehicle 10 captures an image of his or her clothing and accessories etc. and generates a clothing and accessories image by using, e.g., an on-board camera capable of capturing an image of the inside of a vehicle cabin. The vehicle 10 or the server 20 recognizes the user's clothing and accessories from the clothing and accessories image. The server 20 trains a supervised learning model by using schedule information, weather information, etc. at the time the user gets in the vehicle 10 as input data and clothing and accessories information indicating recognized clothing and accessories as output data. That is, the server 20 trains the supervised learning model based on what kind of clothing and accessories the user wears according to the schedule information, weather information, etc. Based on the trained supervised learning model, the server 20 estimates clothing and accessories according to the schedule information etc. for the next time the user gets in the vehicle 10 and sends clothing and accessories recommendation information indicating the estimated clothing and accessories to the terminal device 30. The terminal device 30 notifies the user of the received clothing and accessories recommendation information.

As described above, according to the present embodiment, by using schedule information, weather information, etc. at the time the user gets in the vehicle 10 as input data and clothing and accessories information indicating recognized clothing and accessories as output data a supervised learning model is trained, and clothing and accessories according to user's future schedule information, weather information, etc. are recommended based on the trained supervised learning model. The user therefore need not operate a camera to take pictures of his or her own clothing and accessories and also need not manually register his or her clothing and accessories in conjunction with his or her schedule. The present embodiment thus improves convenience of the technique of recommending clothing and accessories to users.

Next, each configuration of the information processing system 1 will be described in detail.

Configuration of Vehicle

Figure 2:
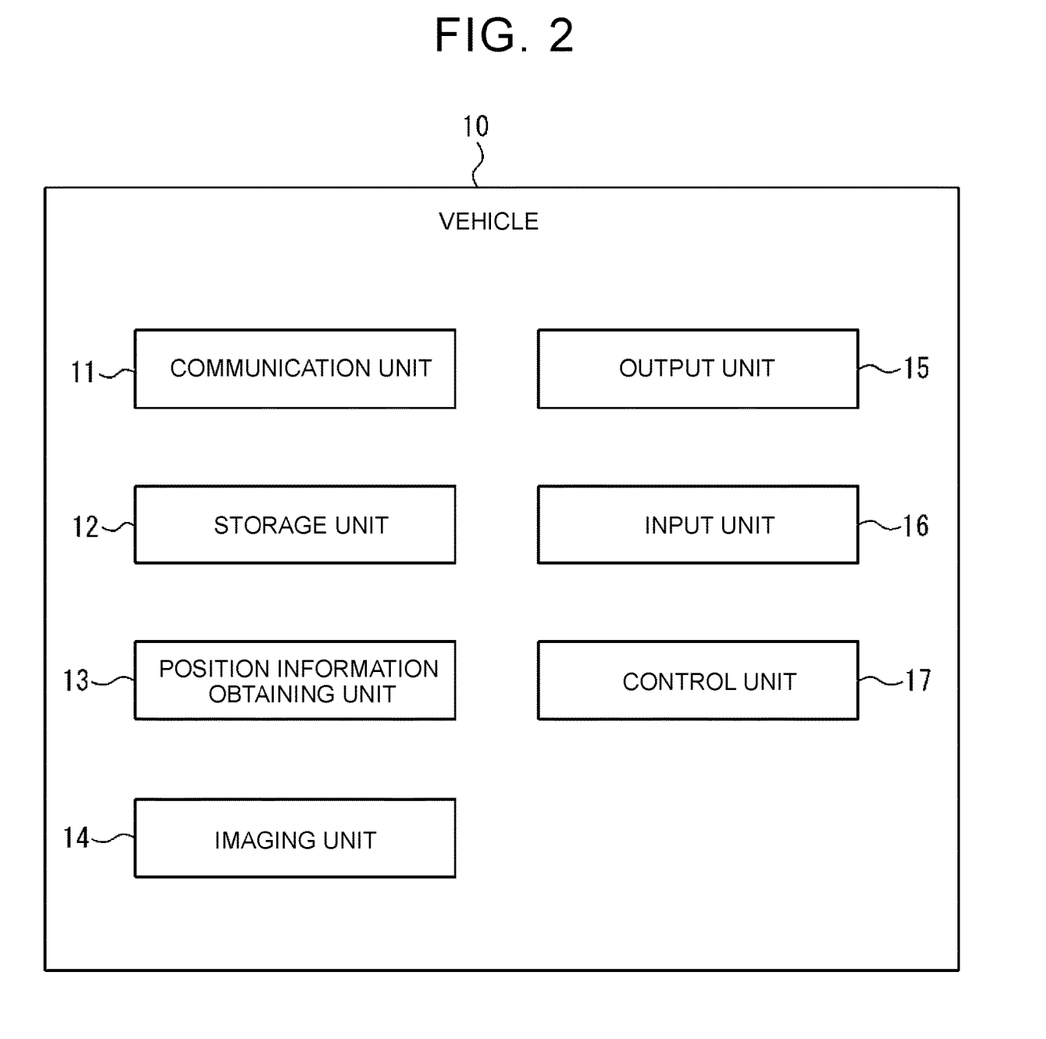
FIG. 2 is a block diagram schematically showing the configuration of a vehicle.

As shown in FIG. 2, the vehicle 10 includes a communication unit 11, a storage unit 12, a position information obtaining unit 13, an imaging unit 14, an output unit 15, an input unit 16, and a control unit 17. The communication unit 11, the storage unit 12, the position information obtaining unit 13, the imaging unit 14, the output unit 15, the input unit 16, and the control unit 17 are connected so that they can communicate with each other via, e.g., an on-board network such as controller area network (CAN) or a leased line.

For example, the communication unit 11 is an on-board communication device such as data communication module (DCM). Specifically, the communication unit 11 includes a processor, a memory, and a communication module connected to the network 40. For example, the communication module is compatible with, but not limited to, mobile communication standards such as 4th generation (4G) and 5th generation (5G). The communication module may be compatible with any desired communication standard. In the present embodiment, the vehicle 10 is connected to the network 40 via the communication unit 11.

The storage unit 12 includes one or more memories. In the present embodiment, examples of the "memory" include, but are not limited to, a semiconductor memory, a magnetic memory, and an optical memory. Each memory included in the storage unit 12 may function as, e.g., a main storage device, an auxiliary storage device, or a cache memory. The storage unit 12 stores any information that is used for operation of the vehicle 10. For example, the storage unit 12 may store a system program, an application program, embedded software, etc. For example, the information stored in the storage unit 12 may be updated with information obtained from the network 40 via the communication unit 11.

The position information obtaining unit 13 is a device that obtains position information of the vehicle 10. Specifically, the position information obtaining unit 13 includes a receiver compatible with a satellite positioning system. For example, the receiver is compatible with, but not limited to, a global positioning system (GPS). The receiver may be compatible with any desired satellite positioning system. In the present embodiment, the vehicle 10 obtains its position information by using the position information obtaining unit 13.

The imaging unit 14 is a camera that captures and generates an image of an object located within its field of view. The imaging unit 14 is provided in the vehicle 10 so that it can capture an image of the face and clothing and accessories of the user who has gotten in the vehicle 10. For example, the imaging unit 14 may be an on-board camera (interior-facing camera) that is used for driver assistance. In the present embodiment, the vehicle 10 captures an image of clothing and accessories of the user who has gotten in the vehicle 10 and generates a clothing and accessories image by using the imaging unit 14. The clothing and accessories image may include the user's face in addition to his or her clothing and accessories.

The output unit 15 includes one or more output interfaces that output information to notify the user of the information. Examples of the output interface(s) included in the output unit 15 include, but are not limited to, a display that outputs information in the form of an image or video and a speaker that outputs information in the form of sound.

The input unit 16 includes one or more input interfaces that detect user input. Examples of the input interface(s) included in the input unit 16 include, but are not limited to, physical keys, capacitive keys, a touch screen integral with the display of the output unit 15, and a microphone that receives voice input.

The control unit 17 includes one or more processors. In the present embodiment, the "processor" is, but not limited to, a general-purpose processor or a special processor exclusively for specific processing. For example, an electronic control unit (ECU) mounted on the vehicle 10 may function as the control unit 17. The control unit 17 controls the overall operation of the vehicle 10. The operation of the vehicle 10 which is controlled by the control unit 17 will be described in detail later.

Configuration of Server

Figure 3:
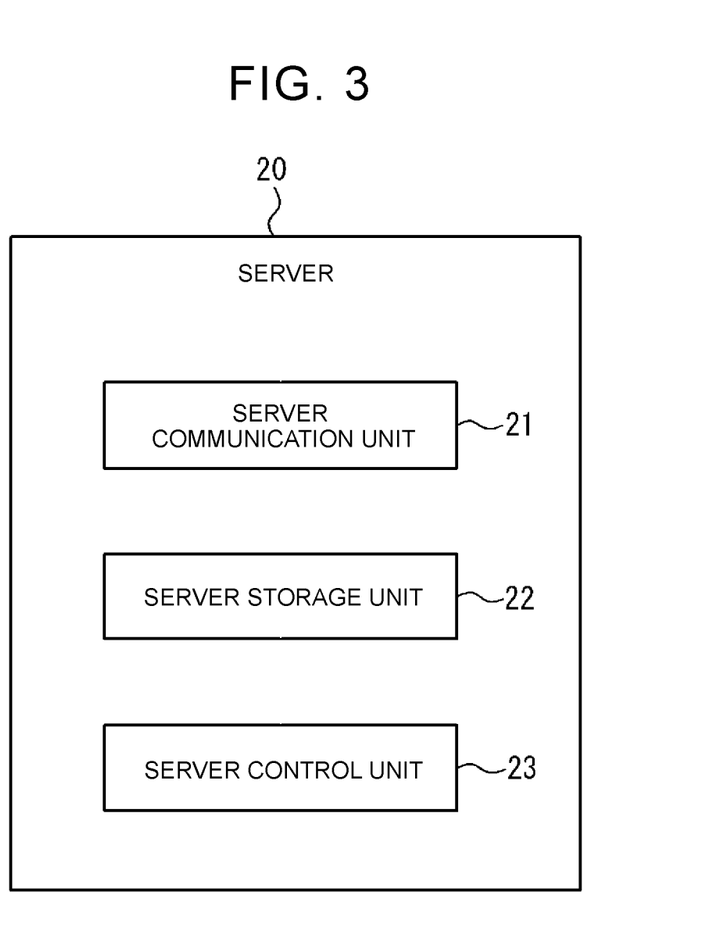
FIG. 3 is a block diagram schematically showing the configuration of a server.

As shown in FIG. 3, the server 20 includes a server communication unit 21, a server storage unit 22, and a server control unit 23.

The server communication unit 21 includes one or more communication modules connected to the network 40. For example, the server communication unit 21 may include a communication module compatible with a wired local area network (LAN) standard. In the present embodiment, the server 20 is connected to the network 40 via the server communication unit 21.

The server storage unit 22 includes one or more memories. Each memory included in the server storage unit 22 may function as, e.g., a main storage device, an auxiliary storage device, or a cache memory. The server storage unit 22 stores any information that is used for operation of the server 20. For example, the server storage unit 22 may store a system program, an application program, a database, a supervised learning model described later, etc. For example, the information stored in the server storage unit 22 may be updated with information obtained from the network 40 via the server communication unit 21.

Figure 4:
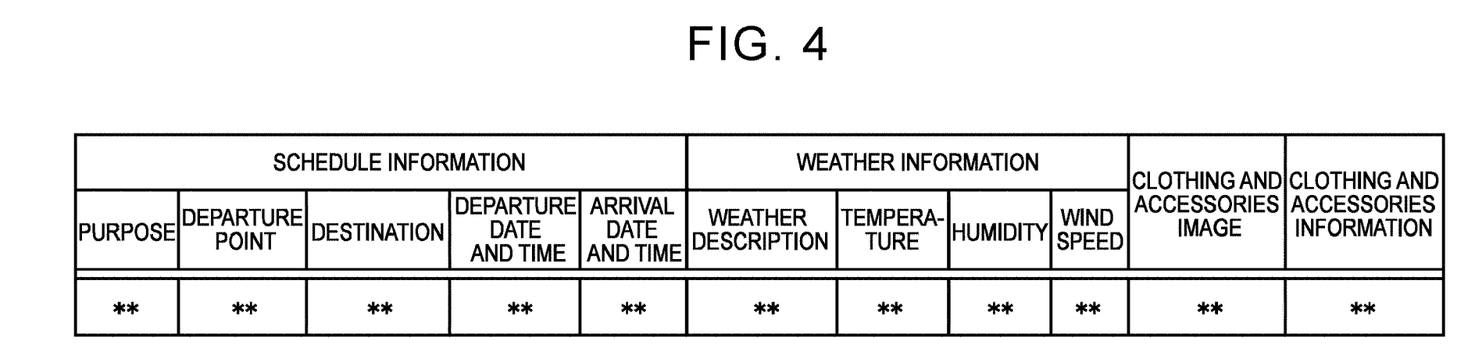
FIG. 4 is a diagram showing an example of information that is stored in the server.

Information that is stored in the database of the server storage unit 22 will be described with reference to FIG. 4. In the present embodiment, schedule information, weather information, clothing and accessories images, and clothing and accessories information are stored in the database.

The schedule information includes any desired information regarding the past and future schedules that involve user's traveling in the vehicle 10. For example, the schedule information includes at least one of the purpose of using the vehicle 10, a departure point, a destination, departure date and time, and arrival date and time. The purpose of using the vehicle 10 indicates any purpose of using the vehicle 10 such as, e.g., "shopping" or "commuting." The departure point is information indicating the location where the vehicle 10 starts traveling and is indicated by, e.g., position information, a facility name, etc. The destination is information indicating the location where the vehicle 10 finishes traveling and is indicated by, e.g., position information, a facility name, etc. The departure date and time is information on the date and time the vehicle 10 starts traveling. The arrival date and time is information on the date and time the vehicle 10 finishes traveling.

At least a part of the schedule information may be input in advance to the vehicle 10 or the terminal device 30 by, e.g., the user and may be sent from the vehicle 10 or the terminal device 30 to the server 20 via the network 40. At least a part of the schedule information may be sent from, e.g., an external server that provides a schedule management service used by the user to the server 20 via the network 40. At least a part of the schedule information may be estimated by the server control unit 23 based on, e.g., the user's past schedule information stored in the database. For example, in the case where the user's past schedule information indicates that the user travels in the vehicle 10 from a specific departure point to a specific destination in the same timeframe every week, the schedule information for this timeframe in the next week may be estimated on the assumption that the user will travel in the vehicle 10 from this departure point to this destination in this timeframe next week. At least a part of the schedule information regarding the past schedules may be estimated by the server control unit 23 based on probe data obtained when the user traveled in the vehicle 10.

For example, the probe data includes, but is not limited to, date and time information, position information of the vehicle 10, etc. The probe data may include any data regarding the vehicle 10 such as turning on or off of accessories or ignition.

The weather information is information indicating weather description (e.g., sunny, rainy), temperature, humidity, wind speed, etc. corresponding to the schedule information. Specifically, the weather information is information indicating weather description etc. of an area including a travel route from the departure point to the destination in the timeframe from the departure date and time to the arrival date and time shown by the schedule information. The weather information may be sent from, e.g., an external server managed by a provider such as a meteorological agency etc. to the server 20 via the network 40.

The clothing and accessories image is an image generated by the vehicle 10 as described above and including the face and clothes and accessories of the user who has gotten in the vehicle 10. The clothing and accessories image is sent from the vehicle 10 to the server 20 via the network 40.

The clothing and accessories information is information indicating user's clothing and accessories recognized from the clothing and accessories image. In the present embodiment, the server control unit 23 recognizes user's clothing and accessories from the clothing and accessories image by image recognition processing. Any desired image recognition algorithm such as, e.g., pattern matching, feature point extraction, or machine learning may be used for the image recognition processing. In the present embodiment, the clothing and accessories information includes clothing and accessories identification information that allows the user to uniquely identify the recognized clothing and accessories. Examples of the clothing and accessories identification information include, but are not limited to, the names, images, and IDs of the clothing and accessories.

The supervised learning model is a mathematical model that uses at least one of the schedule information and the weather information at the time the user gets in the vehicle 10 as input data and uses the clothing and accessories information indicating user's clothing and accessories recognized from the clothing and accessories image as training data to train the supervised learning model. For example, the supervised learning model is, but not limited to, a neural network including an input layer, one or more intermediate layers, and an output layer. For example, the supervised learning model is designed based on the assumption that the user selects clothing and accessories that he or she thinks appropriate according to at least one of the schedule information and the weather information as clothing and accessories he or she is going to wear. The input data of the supervised learning model is therefore not limited to the schedule information and the weather information but may be any data that can contribute to selection of clothing and accessories by the user.

Training of the supervised learning model is performed by the server control unit 23. Training of the supervised learning model may be either batch training or online training. The supervised learning model having completed batch training or having performed online training to a certain degree is hereinafter also referred to as the trained supervised learning model. In the case of online learning, the supervised learning model may continue to train even after it performs online training to a certain degree.

If at least one of schedule information and weather information for the next time the user gets in the vehicle 10 (i.e., future schedule information and future weather information) is input to the trained supervised learning model, the trained supervised learning model estimates clothing and accessories according to at least one of the schedule information and the weather information and outputs clothing and accessories information indicating the estimated clothing and accessories. The clothing and accessories information that is output from the supervised learning model having received at least one of the schedule information and the weather information for the next time the user gets in the vehicle 10 is also referred to as clothing and accessories recommendation information. For example, the clothing and accessories recommendation information is sent from the server 20 to the terminal device 30 via the network 40 at a predetermined time before the next time the user gets in the vehicle 10. For example, the terminal device 30 notifies the user of the clothing and accessories recommendation information by outputting an image or sound.

The server control unit 23 shown in FIG. 3 includes one or more processors. The server control unit 23 controls the overall operation of the server 20. The operation of the server 20 which is controlled by the server control unit 23 will be described in detail later.

Configuration of Terminal Device

Figure 5:
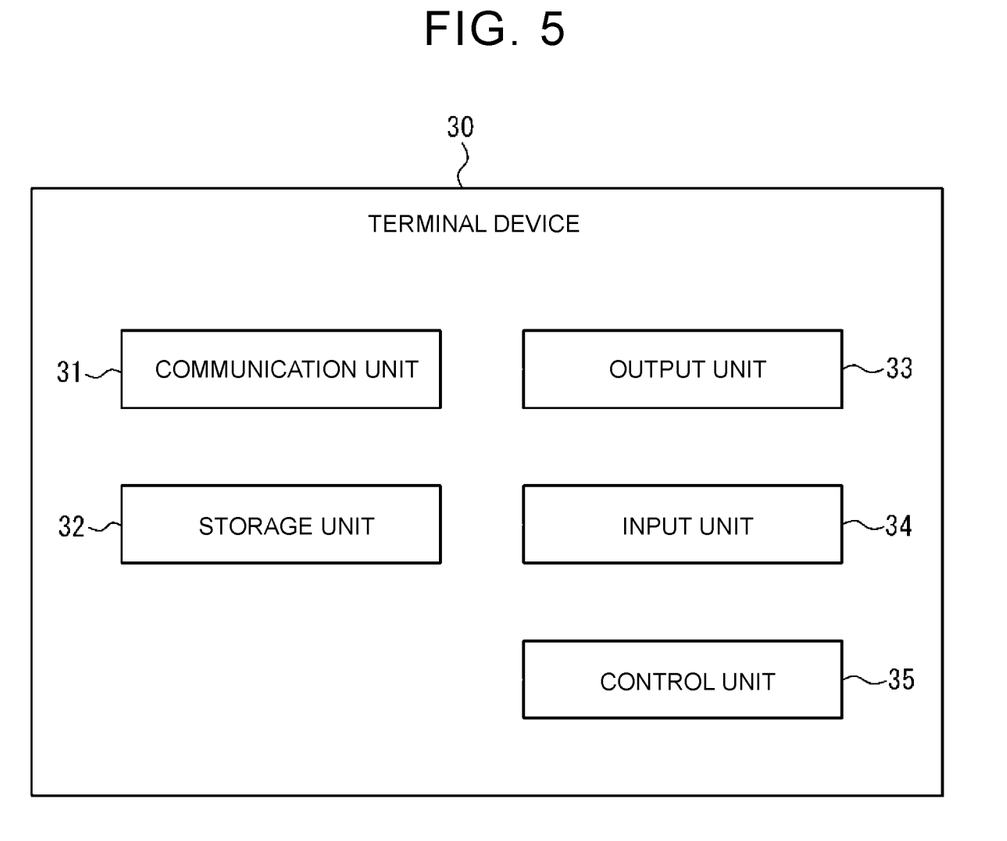
FIG. 5 is a block diagram schematically showing the configuration of a terminal device.

As shown in FIG. 5, the terminal device 30 includes a communication unit 31, a storage unit 32, an output unit 33, an input unit 34, and a control unit 35.

The communication unit 31 includes a communication module connected to the network 40. For example, the communication unit 31 may include a communication module compatible with mobile communication standards such as 4G and 5G. In the present embodiment, the terminal device 30 is connected to the network 40 via the communication unit 31.

The storage unit 32 includes one or more memories. Each memory included in the storage unit 32 may function as, e.g., a main storage device, an auxiliary storage device, or a cache memory. The storage unit 32 stores any information that is used for operation of the terminal device 30. For example, the storage unit 32 may store a system program, an application program, etc. For example, the information stored in the storage unit 32 may be updated with information obtained from the network 40 via the communication unit 31.

The output unit 33 includes one or more output interfaces that output information to notify the user of the information. Examples of the output interface(s) included in the output unit 33 include, but are not limited to, a display that outputs information in the form of an image or video and a speaker that outputs information in the form of sound.

The input unit 34 includes one or more input interfaces that detect user input. Examples of the input interface(s) included in the input unit 34 include, but are not limited to, physical keys, capacitive keys, a touch screen integral with the display of the output unit 33, and a microphone that receives voice input.

The control unit 35 includes one or more processors. The control unit 35 controls the overall operation of the terminal device 30.

For example, when the control unit 35 detects input of schedule information at the time the user gets in the vehicle 10 via the input unit 34, the control unit 35 stores the schedule information in the storage unit 32.

For example, the control unit 35 sends the schedule information stored in the storage unit 32 to the server 20 or an external server that provides a schedule management service that is used by the user via the communication unit 31 and the network 40.

For example, when the control unit 35 receives clothing and accessories recommendation information from the server 20 via the communication unit 31 and the network 40, the control unit 35 outputs the clothing and accessories recommendation information in the form of an image or video or sound via the output unit 33. As described above, the clothing and accessories recommendation information is information indicating clothing and accessories according to at least one of schedule information and weather information for the next time the user gets in the vehicle 10. As the control unit 35 outputs the clothing and accessories recommendation information in the form of an image or video or sound, the clothing and accessories indicated by the clothing and accessories recommendation information are recommended to the user.

Operation Flow of Vehicle

Figure 6:
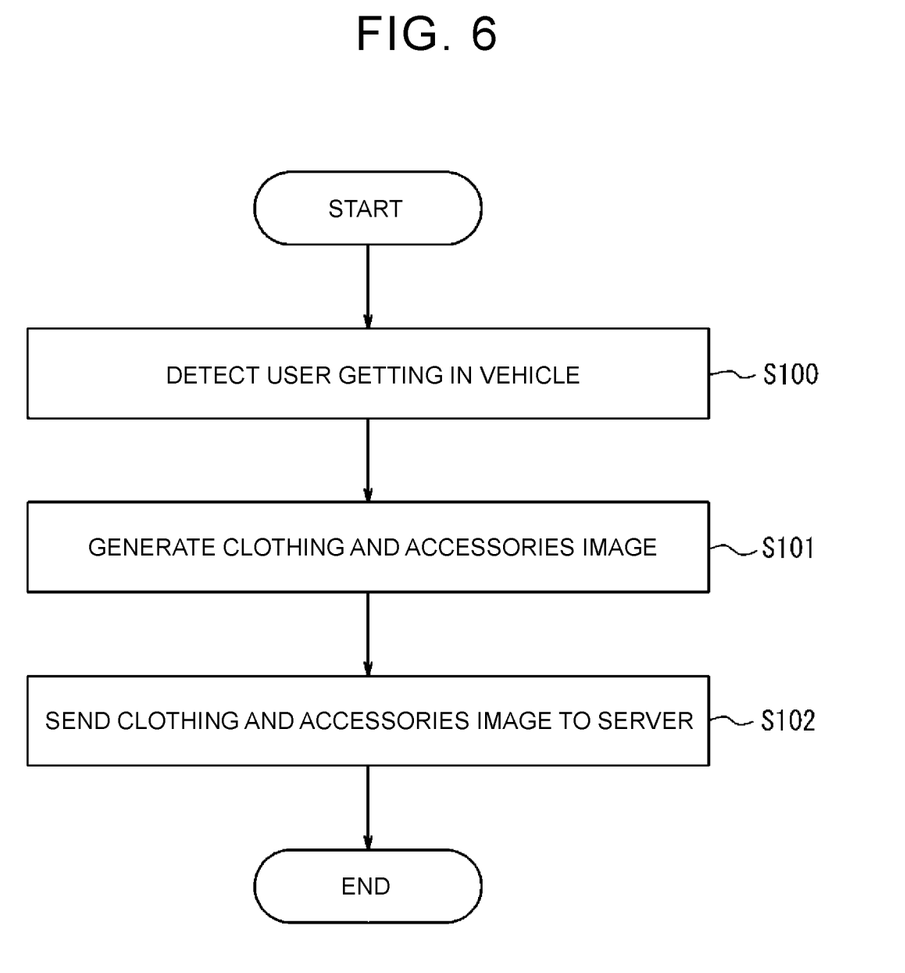
FIG. 6 is a flowchart illustrating operation of the vehicle.

The operation flow of the vehicle 10 will be described with reference to FIG. 6.

Step S100: The control unit 17 detects that the user has gotten in the vehicle 10. For example, the control unit 17 may determine that the user has gotten in the vehicle 10 when it detects at least one of turning on of accessories, turning on of ignition, opening and closing of a door, and load applied to a seat from sensors mounted on the vehicle 10. However, the way to detect that the user has gotten in the vehicle 10 is not limited to this example, and any desired method may be used.

Step S101: The control unit 17 captures an image of user's clothing and accessories and generates a clothing and accessories image by using the imaging unit 14. As described above, the clothing and accessories image may further include the user's face in addition to his or her clothing and accessories.

Step S102: The control unit 17 sends the clothing and accessories image to the server 20.

Operation Flow of Server

Figure 7:
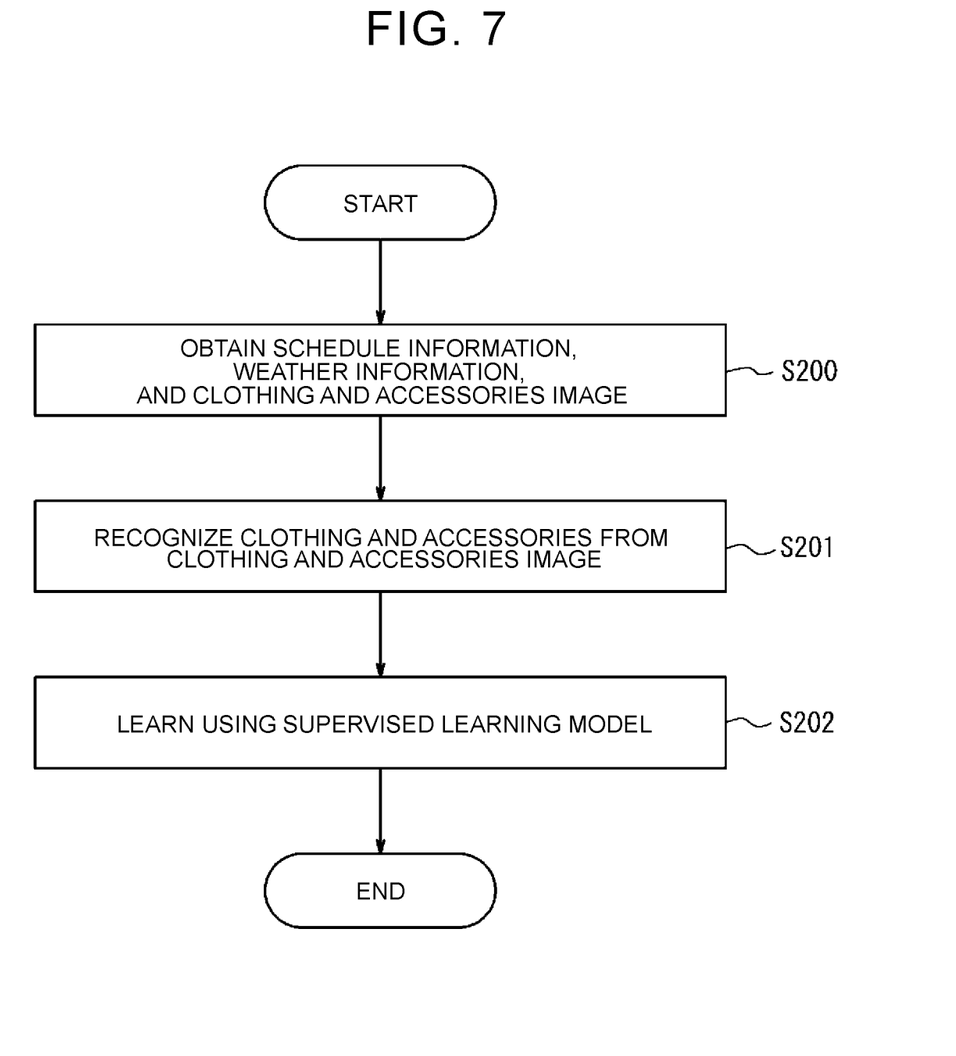
FIG. 7 is a flowchart illustrating a first operation of the server.

The flow of a first operation of the server 20 will be described with reference to FIG. 7. The first operation is generally an operation of training the supervised learning model.

Step S200: The server control unit 23 obtains schedule information, weather information, and a clothing and accessories image at the time the user gets in the vehicle 10 via the server communication unit 21 and the network 40 and stores them in the database of the server storage unit 22.

For example, the server control unit 23 may obtain at least a part of the schedule information from the vehicle 10, the terminal device 30, or an external server via the network 40 and the server communication unit 21. The server control unit 23 may obtain at least a part of the schedule information by estimation based on the user's past schedule information stored in the database of the server storage unit 22. The server control unit 23 may obtain at least a part of the schedule information by estimation based on the probe data of the vehicle 10 received via the network 40 and the server communication unit 21. The server control unit 23 may obtain the weather information from an external server via the network 40 and the server communication unit 21. The server control unit 23 may receive the clothing and accessories image from the vehicle 10 via the network 40 and the server communication unit 21.

Step S201: The server control unit 23 recognizes user's clothing and accessories from the clothing and accessories image. When the clothing and accessories image includes the user's face, the server control unit 23 may determine by face authentication if the user is a registered user, namely a user that has been preregistered. If it is determined that the user is a registered user, the server control unit 23 recognizes the clothing and accessories from the clothing and accessories image. If it is determined that the user is not a registered user, the first operation may be terminated without recognizing the clothing and accessories from the clothing and accessories image.

Step S202: The server control unit 23 by using at least one of schedule information of the user and weather information at the time the user gets in the vehicle as input data, and clothing and accessories information indicating the recognized clothing and accessories as training data. As described above, training of the supervised learning model may be either batch training or online training.

Figure 8:
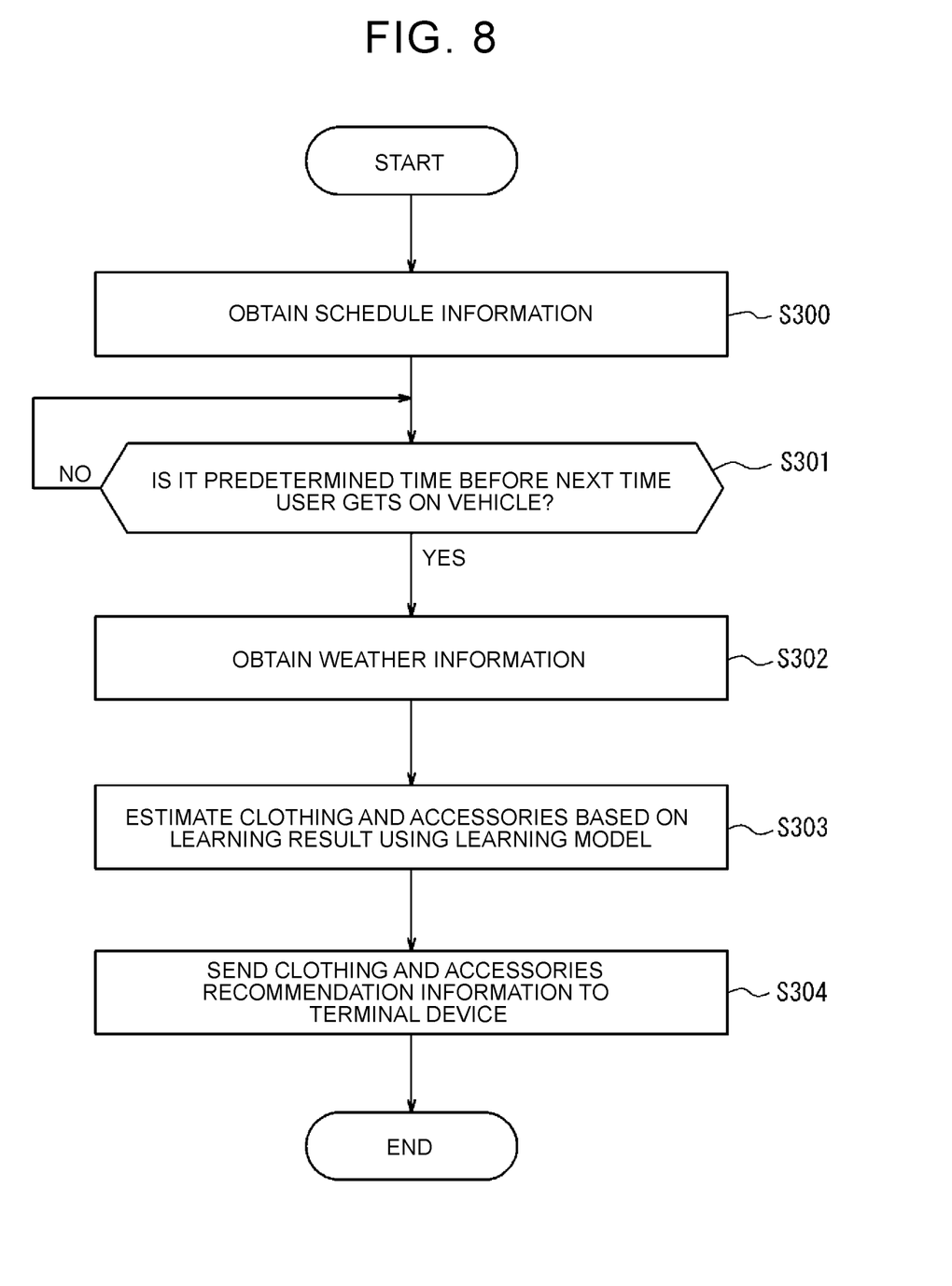
FIG. 8 is a flowchart illustrating a second operation of the server.

The flow of a second operation of the server 20 will be described with reference to FIG. 8. The second operation is generally an operation of generating and sending clothing and accessories recommendation information.

Step S300: The server control unit 23 obtains schedule information for the next time the user gets in the vehicle 10.

For example, the server control unit 23 may obtain at least a part of the schedule information from the vehicle 10, the terminal device 30, or an external server via the network 40 and the server communication unit 21. The server control unit 23 may obtain at least a part of the schedule information by estimation based on the user's past schedule information stored in the database of the server storage unit 22.

Step S301: The server control unit 23 refers to the departure date and time in the schedule information and determines if it is a predetermined time before the next time the user gets in the vehicle 10. If it is determined that it is a predetermined time before the next time the user gets in the vehicle 10 (step S301, Yes), the process proceeds to step S302. If it is determined that it is not a predetermined time before the next time the user gets in the vehicle 10 (step S301, No), the process repeats step S301.

Step S302: The server control unit 23 obtains weather information for the next time the user gets in the vehicle 10. For example, the server control unit 23 may obtain the weather information from an external server via the network 40 and the server communication unit 21.

Step S303: The server control unit 23 estimates clothing and accessories according to at least one of the schedule information and the weather information for the next time the user gets in the vehicle 10 by using the trained supervised learning model (i.e., based on the learning result using the supervised learning model).

Step S304: The server control unit 23 sends clothing and accessories recommendation information indicating the estimated clothing and accessories to the user's terminal device 30 via the server communication unit 21 and the network 40.

As described above, in the information processing system 1 according to the present embodiment, the vehicle 10 captures an image of user's clothing and accessories when the user gets in the vehicle 10 to generate a clothing and accessories image. The server 20 recognizes the user's clothing and accessories from the clothing and accessories image. The server 20 trains the supervised learning model by using at least one of schedule information of the user and weather information at the time the user gets in the vehicle 10 as input data, and clothing and accessories information indicating the recognized clothing and accessories as training data. The server 20 estimates clothing and accessories according to at least one of schedule information and weather information for the next time the user gets in the vehicle 10 based on the learning result using the supervised learning model. The server 20 then sends clothing and accessories recommendation information indicating the estimated clothing and accessories to the user's terminal device 30.

With this configuration, by using schedule information, weather information, etc. at the time the user gets in the vehicle 10 as input data and clothing and accessories information indicating recognized clothing and accessories as output data a supervised learning model, and clothing and accessories according to user's future schedule information etc. are recommended based on the learning result. The user therefore need not operate a camera to take pictures of his or her own clothing and accessories and also need not manually register his or her clothing and accessories in conjunction with his or her schedule. This configuration thus improves convenience of the technique of recommending clothing and accessories to users.

Although the present disclosure is described above based on the drawings and the examples, it is to be understood that a person skilled in the art would readily make various modifications and alterations based on the disclosure and such modifications and alterations therefore fall within the scope of the present disclosure. For example, the functions etc. included in the configuration units, steps, etc. can be rearranged so as to be logically consistent, and a plurality of configuration units, steps, etc. may be combined into one configuration unit, step, etc. or may be divided into multiple configuration units, steps, etc.

For example, the above embodiment is described with respect to the configuration in which the server 20 performs the process of recognizing user's clothing and accessories from a clothing and accessories image. However, the vehicle 10, instead of the server 20, may perform this process. In this case, the vehicle 10 sends, either instead of or together with a clothing and accessories image, clothing and accessories information indicating recognized clothing and accessories to the server 20.

For example, the terminal device 30 may have the configuration and functions of the server 20.

For example, the above embodiment is described with respect to the configuration in which clothing and accessories information includes clothing and accessories identification information that allows the user to uniquely identify clothing and accessories recognized from a clothing and accessories image. In this configuration, a clothing/accessory item A, B, or C is recommended as a clothing/accessory item for the user to wear the next time he or she gets in the vehicle 10 out of a plurality of clothing/accessory items (e.g., items A, B, and C) the user was wearing when he or she got in the vehicle 10 in the past. However, the clothing and accessories information is not limited to the clothing and accessories identification information but may include attribute information of clothing and accessories recognized from a clothing and accessories image. The attribute information is information indicating any attribute of clothing and accessories such as type, material, color, etc. With this configuration, for example, the attribute of clothing and accessories such as, e.g., "black coat," "red muffler," etc. is recommended to the user. This can motivate the user to select clothing and accessories other than those the user was wearing when the user got in the vehicle 10 in the past.

One or more general-purpose information processing devices such as a smartphone or a computer may function as the server 20 according to the above embodiment. Specifically, a program describing the processes that implement the functions of the server 20 according to the embodiment is stored in a memory(ies) of the information processing device(s), and the processor(s) of the information processing device(s) reads and execute the program. The embodiments in the present disclosure can therefore be implemented as a program that can be executed by a processor.

What is claimed is:

1. An information processing system comprising:
   a vehicle configured to capture an image of clothing and accessories of a user at a time when the user gets in the vehicle to generate a clothing and accessories image; and
   a server configured to communicate with the vehicle and a terminal device of the user, wherein
   the vehicle or the server is configured to recognize the clothing and accessories of the user from the clothing and accessories image,
   the server is configured to train a supervised learning model by using weather information at the time the user gets in the vehicle as input data, and clothing and accessories information indicating the recognized clothing and accessories as training data,
   the server is configured to determine schedule information of the user for a next time the user gets in the vehicle based upon probe data obtained from the vehicle,
   the server is configured to acquire weather information for the next time the user gets in the vehicle,
   the server is configured to estimate clothing and accessories according to the weather information for the next time the user gets in the vehicle by using the trained supervised learning model, and
   the server is configured to send clothing and accessories recommendation information indicating the estimated clothing and accessories to the terminal device of the user if it is determined, based on the schedule information of the user for the next time the user gets in the vehicle, that it is a predetermined time before the next time the user gets in the vehicle.

2. The information processing system according to claim 1, wherein:
   the clothing and accessories image includes a face of the user; and
   the vehicle or the server is configured to recognize the clothing and accessories of the user from the clothing and accessories image if it is determined from the clothing and accessories image and by face authentication that the user is a registered user that is a user that has been preregistered.

3. The information processing system according to claim 1, wherein each of the clothing and accessories information and the clothing and accessories recommendation information includes clothing and accessories identification information that allows the user to uniquely identify the clothing and accessories or attribute information of the clothing and accessories.

4. The information processing system according to claim 1, wherein
   the server is configured to train the supervised learning model by using schedule information of the user at the time the user gets in the vehicle as input data, and
   the server is configured to estimate the clothing and accessories according to the schedule information of the user for the next time the user gets in the vehicle by using the trained supervised learning model.

5. The information processing system according to claim 4, wherein:
   the schedule information at the time the user gets in the vehicle and the schedule information for the next time the user gets in the vehicle each include at least one of a purpose of using the vehicle, a departure point, a destination, departure date and time, and arrival date and time;

the server is configured to estimate at least a part of the schedule information at the time the user gets in the vehicle based on the probe data obtained from the vehicle; and the probe data obtained from the vehicle includes date and time information and position information of the vehicle at the time the user traveled in the vehicle in the past.

6. The information processing system according to claim 4, wherein the weather information at the time the user gets in the vehicle includes at least one of information indicating weather description, temperature, humidity, and wind speed corresponding to the schedule information of the user at the time the user gets in the vehicle, and the weather information for the next time the user gets in the vehicle includes at least one of information indicating weather description, temperature, humidity, and wind speed corresponding to the schedule information of the user for the next time the user gets in the vehicle.

7. The information processing system according to claim 4, wherein the weather information at the time the user gets in the vehicle includes at least one of information indicating weather description, temperature, humidity, and wind speed of an area including a travel route from a departure point to a destination in a timeframe from a departure date and time to an arrival date and time shown by the schedule information of the user at the time the user gets in the vehicle, and the weather information for the next time the user gets in the vehicle includes at least one of information indicating weather description, temperature, humidity, and wind speed of an area including a travel route from a departure point to a destination in a timeframe from a departure date and time to an arrival date and time shown by the schedule information of the user for the next time the user gets in the vehicle.

8. The information processing system according to claim 1, wherein the weather information at the time the user gets in the vehicle and the weather information for the next time the user gets in the vehicle each include at least one of information indicating weather description, temperature, humidity, and wind speed.

9. The information processing system according to claim 1, wherein the weather information at the time the user gets in the vehicle and the weather information for the next time the user gets in the vehicle each include at least one of information indicating weather description, temperature, humidity, and wind speed of an area including a travel route from a departure point to a destination in a timeframe from a departure date and time to an arrival date and time.

10. The information processing system according to claim 1, wherein the probe data obtained from the vehicle includes information obtained from the vehicle regarding a time the user traveled in the vehicle in the past.

11. The information processing system according to claim 1, wherein the probe data obtained from the vehicle includes date and time information and position information of the vehicle at a time the user traveled in the vehicle in the past.

12. The information processing system according to claim 1, wherein the probe data obtained from the vehicle includes accessory on/off information regarding a time the user traveled in the vehicle in the past.

13. The information processing system according to claim 1, wherein the probe data obtained from the vehicle includes ignition on/off information regarding a time the user traveled in the vehicle in the past.

14. A server, comprising:

a communication device configured to communicate with a vehicle and a terminal device of a user, the vehicle being configured to capture an image of clothing and accessories of the user at a time when the user gets in the vehicle to generate a clothing and accessories image; and a processor configured to:

train a supervised learning model by using weather information at the time the user gets in the vehicle as input data, and clothing and accessories information indicating recognized clothing and accessories as training data, determining schedule information of the user for a next time the user gets in the vehicle based upon probe data obtained from the vehicle, acquire weather information for the next time the user gets in the vehicle, estimate clothing and accessories according to the weather information for the next time the user gets in the vehicle by using the trained supervised learning model, and send clothing and accessories recommendation information indicating the estimated clothing and accessories to the terminal device of the user via the communication device if it is determined, based on the schedule information of the user for the next time the user gets in the vehicle, that it is a predetermined time before the next time the user gets in the vehicle.

15. A non-transitory computer-readable storage medium having stored in the non-transitory computer-readable storage medium a program that causes an information processing device to execute an information processing process of the information processing device, the information processing device being configured to communicate with a vehicle and a terminal device of a user, the vehicle being configured to capture an image of clothing and accessories of the user at a time when the user gets in the vehicle to generate a clothing and accessories image, and the program causing the information processing device to execute the information processing process, the information processing process including:

training, by the information processing device, a supervised learning model by using weather information at the time the user gets in the vehicle as input data, and clothing and accessories information indicating recognized clothing and accessories as training data;

determining, by the information processing device, schedule information of the user for a next time the user gets in the vehicle based upon probe data obtained from the vehicle;

acquiring, by the information processing device, weather information for the next time the user gets in the vehicle;

estimating, by the information processing device, clothing and accessories according to the weather information for the next time the user gets in the vehicle by using the trained supervised learning model; and sending clothing and accessories recommendation information indicating the estimated clothing and accessories from the information processing device to the terminal device of the user if it is determined, based on the schedule information of the user for the next time the user gets in the vehicle, that it is a predetermined time before the next time the user gets in the vehicle.

16. A method for processing information, the method being performed by an information processing system including a vehicle and a server, the vehicle including an imaging device that captures an image of a user of the vehicle, and the server being configured to communicate with the vehicle and a terminal device of the user of the vehicle, the method comprising:
   capturing, by the vehicle, an image of clothing and accessories of the user at a time when the user gets in the vehicle to generate a clothing and accessories image;
   recognizing, by the vehicle or the server, the clothing and accessories of the user from the clothing and accessories image;
   training, by the server, a supervised learning model by using weather information at the time the user gets in the vehicle as input data, and clothing and accessories information indicating the recognized clothing and accessories as training data;
   determining, by the server, schedule information of the user for a next time the user gets in the vehicle based upon probe data obtained from the vehicle;
   acquiring, by the server, weather information for the next time the user gets in the vehicle;
   estimating, by the server, clothing and accessories according to the weather information for the next time the user gets in the vehicle by using the trained supervised learning model; and
   sending clothing and accessories recommendation information indicating the estimated clothing and accessories from the server to the terminal device of the user if it is determined, based on the schedule information of the user for the next time the user gets in the vehicle, that it is a predetermined time before the next time the user gets in the vehicle.

\* \* \* \* \*